(12) United States Patent
Kang et al.

(10) Patent No.: US 10,150,430 B2
(45) Date of Patent: Dec. 11, 2018

(54) ELECTRICAL SOCKET SEATING DEVICE AND VEHICLE INTERIOR TRIM EMPLOYING THE SAME

(71) Applicant: FORD GLOBAL TECHNOLOGIES, LLC, Dearborn, MI (US)

(72) Inventors: Derek Kang, Nanjing (CN); Brick Deng, Nanjing (CN); Kevin Liu, Guoyang (CN); Tom Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/213,979

(22) Filed: Jul. 19, 2016

(65) Prior Publication Data

US 2017/0028941 A1    Feb. 2, 2017

(30) Foreign Application Priority Data

Jul. 29, 2015    (CN) .......................... 2015 1 0456968

(51) Int. Cl.
*B60R 16/02*    (2006.01)
*H01R 13/73*    (2006.01)

(52) U.S. Cl.
CPC ............. *B60R 16/02* (2013.01); *H01R 13/73* (2013.01); *H01R 2201/26* (2013.01)

(58) Field of Classification Search
CPC ... A47B 96/07; A47F 5/0846; A47K 2201/02; H01R 13/631; H01R 13/6315; H01R 13/629; H01R 35/04; B60R 16/02
See application file for complete search history.

(56) References Cited

U.S. PATENT DOCUMENTS

| | | | |
|---|---|---|---|
| 3,881,677 A * | 5/1975 | Ihlenfeld | A47C 7/62 248/224.51 |
| 4,085,867 A * | 4/1978 | Heller | A47K 5/122 222/181.3 |
| 5,382,179 A * | 1/1995 | Noschese | H01R 13/6275 439/369 |
| 5,636,937 A | 6/1997 | Lemlicka | |
| 5,752,859 A * | 5/1998 | Abe | H01R 13/4362 439/595 |

(Continued)

FOREIGN PATENT DOCUMENTS

| | | |
|---|---|---|
| FR | 2737348 A1 | 1/1997 |
| JP | 2002008786 A | 1/2002 |
| JP | 2002025677 A | 1/2002 |

OTHER PUBLICATIONS

English Machine Translation of FR2737348A1.

(Continued)

*Primary Examiner* — Briggitte R Hammond
(74) *Attorney, Agent, or Firm* — Vichit Chea; King & Schickli, PLLC

(57) ABSTRACT

In one or more embodiments, a seating device is provided to support an electrical socket. The seating device includes a body, and a lip extending from the body. The lip includes a head, a tail, and a waist positioned there-between along a longitudinal direction. The waist includes upper and lower protrusions directed outwardly against each other along a thickness direction. The electrical socket contacts and pivots about the upper and lower protrusions from a first engagement position to a second engagement position.

14 Claims, 5 Drawing Sheets

(56) References Cited

U.S. PATENT DOCUMENTS

| | | | |
|---|---|---|---|
| 5,975,935 A * | 11/1999 | Yamaguchi | H01R 13/73 439/374 |
| 6,203,364 B1 | 3/2001 | Chupak et al. | |
| 6,325,652 B1 | 12/2001 | Grant | |
| 6,416,025 B1 * | 7/2002 | Urrutia | B60N 2/005 248/221.11 |
| 6,491,542 B1 * | 12/2002 | Zerebilov | H01R 13/4226 439/352 |
| 6,779,766 B1 * | 8/2004 | Hade | F16M 11/041 108/69 |
| 7,048,581 B1 | 5/2006 | Wong | |
| 7,252,273 B2 * | 8/2007 | Lewellen | A47C 4/02 248/222.14 |
| 9,905,970 B2 * | 2/2018 | Sone | H01R 13/639 |

OTHER PUBLICATIONS

English Machine Translation of JP2002008786A.
English Machine Translation of JP2002025677A.
"Connection Systems Delphi Performance Pack Connection Systems"; Delphi Automotive LLP; http://www.delphi.com/manufacturers/cv/connection-systems/performance-pack; printed Jun. 6, 2016; pp. 1-8.

* cited by examiner

ELECTRICAL SOCKET SEATING DEVICE AND VEHICLE INTERIOR TRIM EMPLOYING THE SAME

TECHNICAL FIELD

The present invention relates to a seating device to support an electrical socket and a vehicle interior trim employing the same.

BACKGROUND

During vehicle use, various electronic devices are often purchased and installed to the vehicle, non-limiting examples of which including a navigation device, an event data recorder, and a head up display (HUD). Therefore, the vehicle may need to be configured with an electric interface attached to the vehicle body structure such as a vehicle interior trim, via which these electronic devices may be electronically connected.

By way of example, U.S. Pat. No. 6,203,364 B1 discloses an electrical socket with a movable clip, where the electrical socket is connected to the clip and then attached to a support structure via the movable clip.

SUMMARY

In one or more embodiments, a seating device is provided to support an electrical socket. The seating device includes a body, and a lip extending from the body. The lip includes a head, a tail, and a waist positioned there-between along a longitudinal direction. The waist includes upper and lower protrusions directed outwardly against each other along a thickness direction, the electrical socket contacting and pivoting about the upper and lower protrusions from a first engagement position to a second engagement position.

The head and waist may together define a first surface and a second surface opposing each other. The tail and waist together define a third surface and a fourth surface opposing each other. The first and the fourth surfaces define there-between an upper angle, and the second and the third surfaces define there-between a lower angle with an angle difference relative to the upper angle being no greater than 25 degrees.

The first surface and the third surface may define there-between a first angle of no greater than 25 degrees.

The second surface and the fourth surface may define there-between a second angle of no greater than 25 degrees.

A first length difference between the first and third surfaces along the longitudinal dimension may be no greater than 25 percent.

A second length difference between the second and fourth surfaces along the longitudinal dimension may be no greater than 25 percent.

The seating device may further comprise a stop extending from the body, the head being positioned between the stop and the tail along the longitudinal direction.

The body may further define a recess positioned between the stop and the head along the longitudinal direction. The recess receives a tongue of the electrical socket at the second engagement position.

The stop may define a protrusion protruding along the longitudinal direction that engages a notch on the tongue of the electrical socket at the second engagement position.

The body may include a first body portion and a second body portion spaced apart from each other. The lip may include a first lip portion and a second lip portion respectively extending from the first and second body portions.

The seating device may further comprise a base, the body being supported on the base by contacting a support surface of the base.

The tail may be further away from the support surface along a height direction than the head.

In another one or more embodiments, a seating device to support an electrical socket may comprise a body, and a lip extending from the body and including a head, a tail and a waist positioned between the head and the tail along a longitudinal direction. The waist includes upper and lower protrusions directed outwardly against each other along a thickness direction, the electrical socket contacting and pivoting about the upper and lower protrusions from a first engagement position to a second engagement position. The head and waist together define first and second surfaces opposing each other. The tail and waist together define third and fourth surfaces opposing each other. The first and fourth surfaces define there-between an upper angle and the second and third surfaces define there-between a lower angle with an angle difference relative to the upper angle being no greater than 25 degrees. The first surface and the third surface define there-between a first angle of no greater than 25 degrees, and the second surface and the fourth surface define there-between a second angle of no greater than 25 degrees.

In another one or more embodiments, a vehicle interior trim assembly includes an electrical socket, and a seating device to support the electrical socket. The seating device includes a body and a lip extending from the body. The lip includes a head, a tail, and a waist positioned there-between along a longitudinal direction. The waist includes an upper protrusion and a lower protrusion directed outwardly against each other along a thickness direction. The electrical socket contacts and pivots about the upper and lower protrusions from a first engagement position to a second engagement position.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION

Figure 1A:
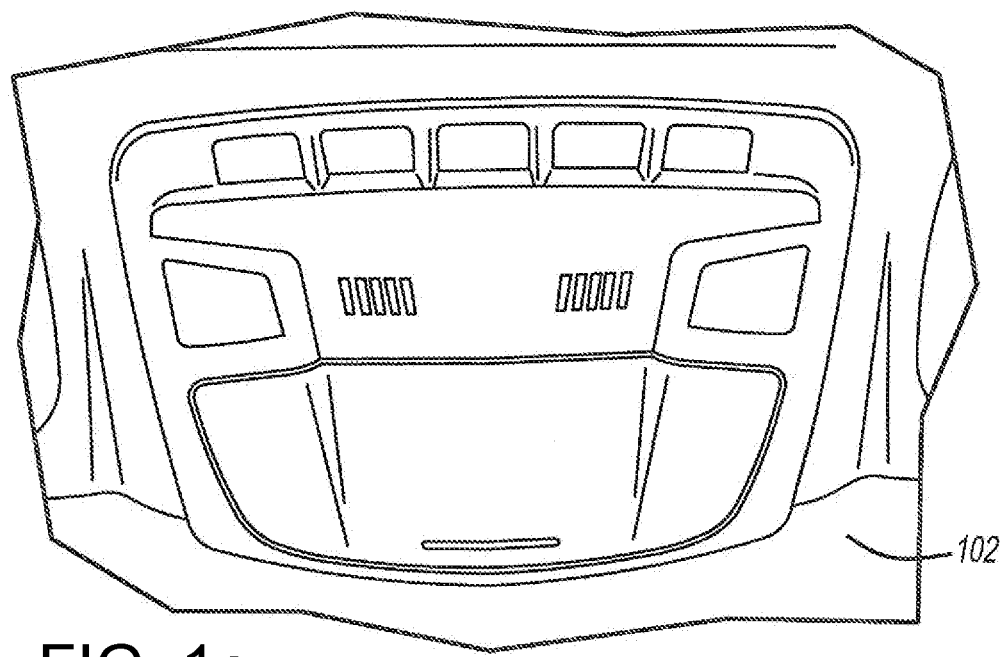
FIG. 1A to FIG. 1B illustratively depict a seating device as positioned relative to a vehicle interior according to one or more embodiments of the present invention.

As referenced in the FIG.s, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

As detailed herein elsewhere, the electrical socket seating device in one or more embodiments is believed to be advantageous in providing a favorable solution for the use of electronic devices. A robust attachment of the electrical socket to the seating device may be maintained even when the vehicle is in operation with turbulence. In particular, a lip with non-uniform thickness is provided to cooperate with a track of the electrical socket, such that the electrical socket may rotate about the lip under a given force, thus providing greater ease in an assembly and disassembly process and providing greater cost efficiency in manufacture and maintenance.

As illustratively depicted in FIG. 1A through FIG. 3, a seating device 100 is provided to support an electrical socket 110, where the seating device 100 includes a body 220, and a lip 230 extending from the body 220. The lip 230 includes a head 232, a tail 234, and a waist 236 positioned between the head 232 and the tail 234 along a longitudinal direction "L". The waist 236 includes an upper protrusion 262 and a lower protrusion 264 directed outwardly against each other along a thickness direction "T". The electrical socket 110 contacts and pivots about the upper and lower protrusions 262, 264 from an entry position as illustratively depicted in FIG. 5A to arrive at a second engagement position as illustratively depicted in FIG. 5C, via a first engagement position as illustratively depicted in FIG. 5B.

Figure 1B:
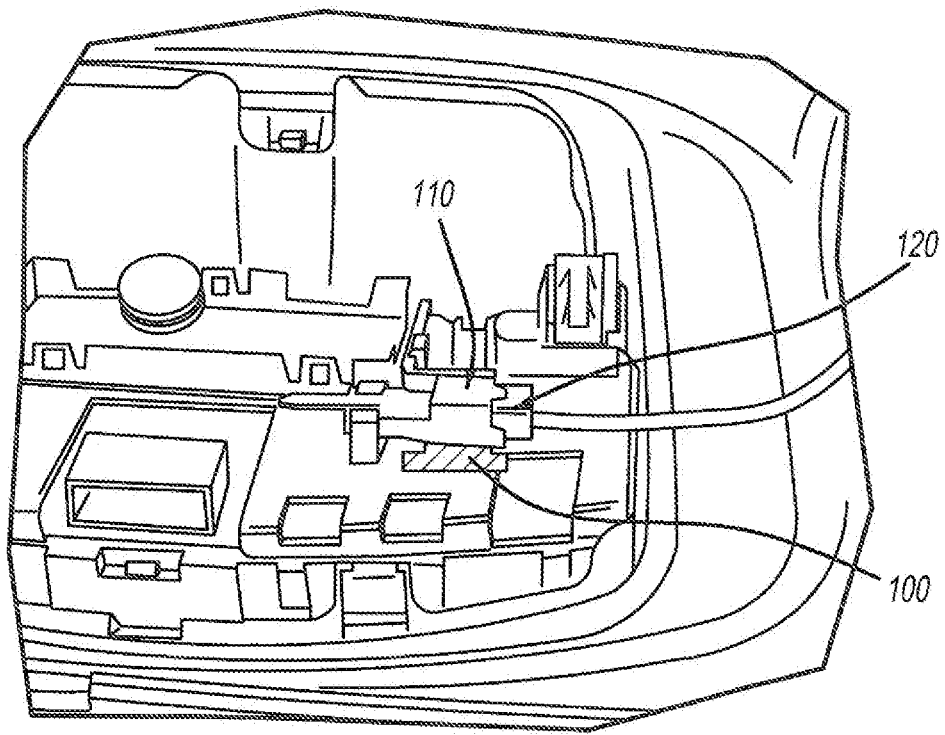

As illustratively depicted in FIG. 1A to FIG. 1B, various electronic devices may be positioned in an overhead console (OHC), such as a speaker, a light, and a switch. Similarly, users may attach various aftermarket electronic devices into the vehicle, such as a global positioning system (GPS) device and an event data recorder. Therefore, it is often needed to provide electrical connection with the vehicle via a cord or cable and a socket to effect charging or data transfer. The seating device 100, in one or more embodiments, may be positioned at the interior trim panel 102 of the OHC to support the electrical socket 110 connected to the vehicle electric system, such that a user or a manufacturer may insert an electrical plug 120 into the electrical socket 110 to establish electric connection between the electronic device and the vehicle electric/information system. Further, the service technician or the user may pull the electrical plug 120 out from the electrical socket 110 as needed such as when the electronic device needs to be replaced. Furthermore, because the vehicle may shake when being driven, a robust attachment between the electrical socket and the vehicle is desirable. Therefore, it is believed to be advantageous in providing a favorable solution via which the electrical socket may be robustly connected to the vehicle.

For illustration purposes, the seating device 100 is illustratively depicted as being located at the interior trim panel 102 of the OHC. In other embodiments, the seating device 100 and its related interior trim assembly may be located at other locations in the vehicle dependent upon any particular requirement of the electronic device, such as other locations at a control panel, a floor console, and a speaker. Furthermore, the interior trim panel 102 may be a portion of the vehicle roof, or a portion of the OHC panel.

Although terms "plug" and "socket" are employed herein, it is to be appreciated that they do not necessarily correspond to male and female connectors, respectively. For instance, the plug may be a male connector while the socket may be a female connector; or the plug may be a female connector while the socket may be a male connector. Furthermore, the electrical socket 110 may be of a well-known type with a track 510 and a tongue 296, and may be formed by elastic materials, such as metals and plastics.

Figure 2:
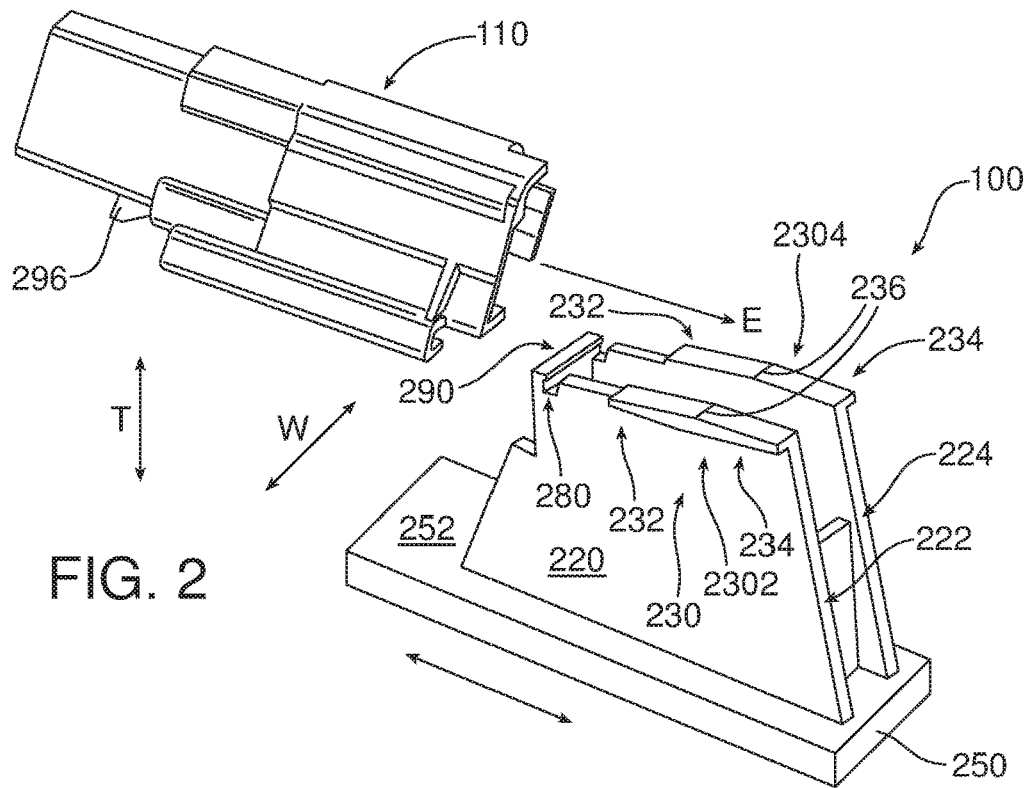
FIG. 2 illustratively depicts a perspective view of the electrical socket and the seating device as referenced in FIG. 1B.

Referring to FIG. 2, and in one or more embodiments, the seating device 100 includes the body 220 and the lip 230 extending from the body 220. It is to be appreciated that although the lip 230 is depicted as positioned at a top portion of the body 220, in other embodiments it may be positioned at other locations of the body 220 along a height direction T, such as at a middle or bottom portion of the body 220. Similarly, as illustratively depicted in FIG. 2, the body 220 may include a first body portion 222 and a second body portion 224 spaced apart from each other. A distance between the first body portion 222 and the second body portion 224 may be sized in accordance with the size of the electrical socket 110, or may be larger or smaller as needed. Furthermore, the lip 230 may include a first lip portion 2302 extending from the first body portion 222 and a second lip portion 2304 extending from the second body portion 224. This structure is believed to be advantageous that a two-piece hollow structure of the body 220 is utilized to reduce material cost; in addition, a distance between the first lip portion 2302 and the second lip portion 2304 along direction W may be increased slightly as needed, such that an elastic engagement may be established between the lip 230 and the socket 110 due to material elasticity of the first and second body portion 222, 224, thereby improving the robustness of the connection between the seating device 100 and the electrical socket 110.

Figure 4:
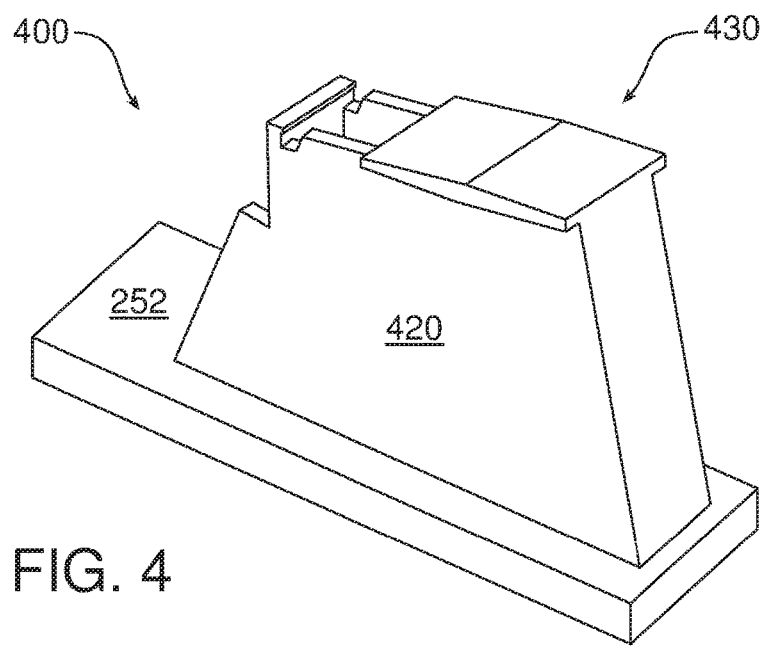
FIG. 4 illustratively depicts a perspective view of an alternative embodiment of the seating device as referenced in FIG. 2.

In an alternative seating device 400 as illustratively depicted in FIG. 4, both a body 420 and a lip 430 extending form a top portion of the body 420 may each independently be of a single construction, such that the body 420 and the lip 430 extending therefrom may each independently be formed of a single construction of the same material. In another alternative to the depiction shown in FIG. 2, the body 420 may be of a single construction as depicted in FIG. 4, while the lip 430 may be of a two-piece construction, for instance, the lip may include a first lip portion and a second lip portion extending from two sides of the body, respectively. It is to be appreciated that the body 420 and the lip 430 may be of any other suitable configurations to meet certain assembly requirements as well as to match the electrical socket.

Referring back to FIG. 2, the lip 230 may extend along direction "L". Particularly, the lip 230 includes the head 232, the waist 236, and the tail 234 positioned along direction "L". In other words, the waist 236 is positioned between the head 232 and the tail 234 along the longitudinal direction "L". The waist 236 includes an upper protrusion 262 and a lower protrusion 264 opposing each other along the height or thickness direction "T". See also FIG. 3. The two protrusions are directed outwardly against each other along the thickness direction "T". More particularly, and as illustratively depicted in FIG. 2, the upper protrusion 262 is directed upwardly along the thickness direction "T", and the lower protrusion 264 is directed downwardly along the direction "T". Accordingly, the lip 230 may define a variable thickness along the longitudinal direction "L". That is, the lip 230 may be of a greater thickness at the waist 236 as compared to the head 232 and the tail 234. As detailed herein elsewhere, by way of forming the upper and lower protrusions 262, 264 at the lip 230, the electrical socket 110 may pivot from the first engagement position as referenced in FIG. 5B to the second engagement position as referenced in FIG. 5C relative to the lip 230.

Figure 3:
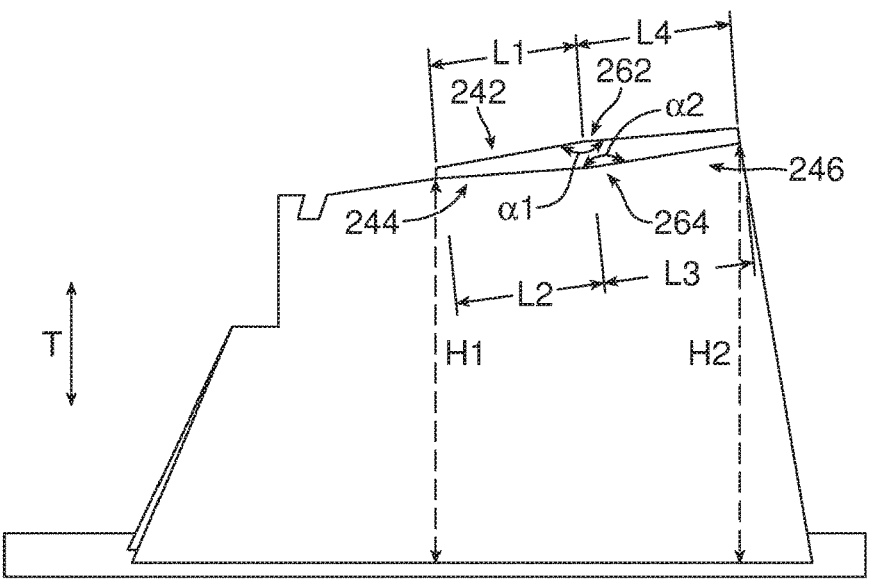
FIG. 3 illustratively depicts a side view of the seating device as referenced in FIG. 2.

In one or more embodiments and as illustratively depicted in FIG. 3, the head 232 and the waist 236 may together define a first surface 242 and a second surface 244 opposing each other. Particularly, the first surface or head upper surface 242 may be formed as a portion of the top surface of the lip 230, and the second surface or head lower surface 244 may be formed as a portion of the bottom surface of the lip 230. Similarly, the tail 234 and the waist 236 may together define a third surface 246 and a fourth surface 248 opposing each other. Particularly, the fourth surface or tail upper surface 248 may be formed as a portion of the top surface of the lip 230, and the third surface or tail lower surface 246 may be formed as a portion of the bottom surface of the lip 230. Accordingly, the first surface 242 and the fourth surface 248 may together define the entire or at least a portion of the top surface of the lip 230, and the second surface 244 and the third surface 246 may together define the entire or at least a portion of the bottom surface of the lip 230.

Furthermore, the first surface 242 and the fourth surface 248 may be positioned in different planes, and may define there-between an upper angle $\alpha 1$. Similarly, the second surface 244 and the third surface 246 may be positioned in different planes, and may define there-between a lower angle $\alpha 2$. In the embodiment depicted in FIG. 3, the upper angle $\alpha 1$ and the lower angle $\alpha 2$ may be of the same value. In other embodiments, the upper angle $\alpha 1$ and the lower angle $\alpha 2$ may be of substantially the same value, or their angle difference may be of a value no greater than 5 degrees, 15 degrees, or 25 degrees.

In other embodiments, the first surface 242 may be separated from the fourth surface 248. In other words, the first surface 242 and the fourth surface 248 may be spaced apart with each other or be formed with a transition surface (not shown) there-between. The transition surface may be of various configurations or shapes, such as a plain, an arch, or an angled surface. Similarly, the second surface 244 and the third surface 246 may be spaced apart from each other or be formed with another transition surface (not shown) there-between.

Referring back to FIG. 3, and in one or more embodiments, the first surface 242 may be parallel to the third surface 246, and the second surface 244 may be parallel to the fourth surface 248. In other embodiments, the first surface 242 and the third surface 246 may be substantially parallel to each other, or a first angle defined there-between may be no greater than 5 degrees, 15 degrees, or 25 degrees. Similarly, the second surface 244 and the fourth surface 248 may be substantially parallel to each other, or a second angle defined there-between may be no greater than 5 degrees, 15 degrees, or 25 degrees.

Figure 5A:
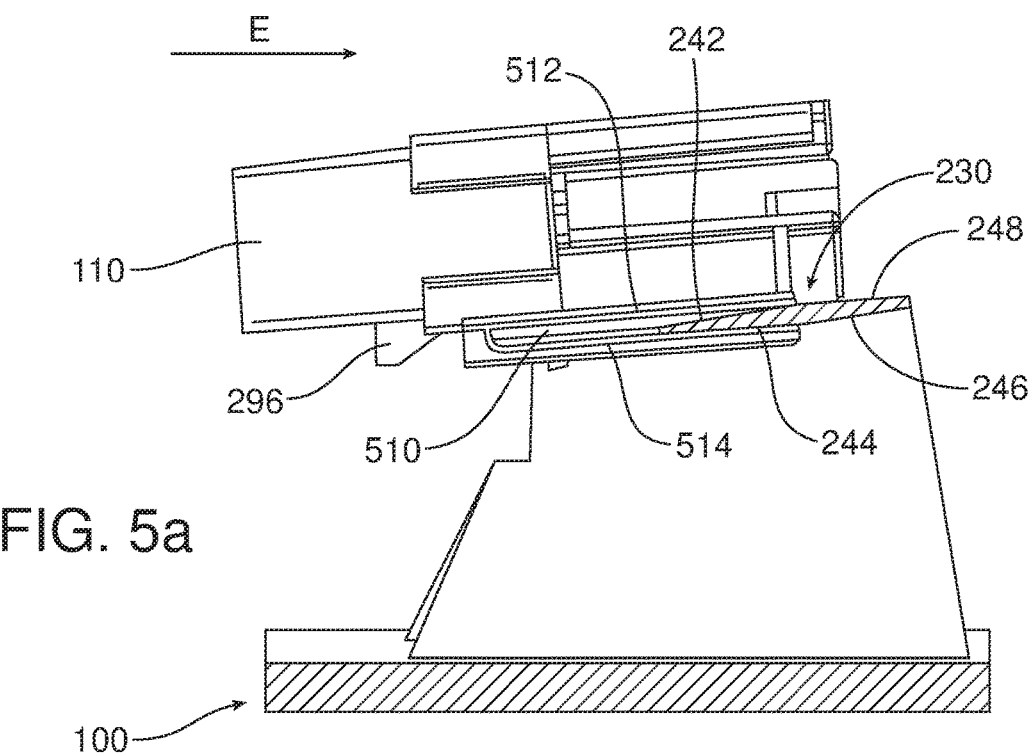
FIG. 5A illustratively depicts a partially cross sectional view of the electrical socket and the seating device referenced in FIG. 2 at an entry position.

Furthermore, and in view of FIG. 5A, the relative position and/or distance between the first surface 242 and the third surface 246 may substantially correspond to the position of an upper surface 512 and a lower surface 514 of the track 510 of the electrical socket 110, and/or to the distance there-between which is also the height of the track 510. For instance, the distance between the first surface 242 and the third surface 246 may be substantially equal to the height of the track 510. Similarly, the relative position and/or distance between the second surface 244 and the fourth surface 248 may substantially correspond to the height of the track 510. For instance, the distance between the second surface 244 and the fourth surface 248 may be substantially equal to the height of the track 510. As detailed herein elsewhere, with this structure, a reasonable amount of resistance may be provided when the electrical socket 110 pivots relative to the seating device 100 to prevent the socket 110 from unwantedly detaching from the seating device 100 when the vehicle is being driven. In other embodiments, the distance between the first surface 242 and the third surface 246 and/or the distance between the second surface 244 and the fourth surface 248 may be greater than the height of the track 510, thus providing an interference fit between the track 510 and the lip 230 to further improve on the robustness of the connection.

Referring back to FIG. 3, and in one or more embodiments, the first surface 242 and the third surface 246 may be of the same length. Particularly, the first surface 242 may be of a length L1 along the longitudinal direction "L" while the third surface 246 may be of a length L3 along the longitudinal direction "L", and L1 and L3 may be of the same value. In other embodiments, L1 and L3 may be of substantially the same value, or a first length difference between the first surface 242 and third surfaces 246 is no greater than 25 percent, that is, the first length difference may be no greater than 25% of L1 or may be no greater than 25% of L3. In certain instances, the first length difference between L1 and L3 is no greater than 5 percent or 15 percent.

Similarly, and in one or more embodiments, the second surface 244 and the fourth surface 248 may be of the same length. Particularly, the second surface 244 may be of a length L2 along the longitudinal direction "L" while the fourth surface 248 may be of a length L4 along the longitudinal direction "L", and L2 and L4 may be of the same value. In other embodiments, L2 and L4 may be of substantially the same value, or a second length difference between the second surface 244 and fourth surfaces 248 is no greater than 25 percent, that is, the second length difference may be no greater than 25% of L2 or may be no greater than 25% of L4. In certain instances, the second length difference between L2 and L4 is no greater than 5 percent or 15 percent.

Referring back to FIG. 2, and in one or more embodiments, the seating device 100 may include a stop 290. The stop 290 may extend from the body 220 along the thickness direction "T". Furthermore, the head 232 of the lip 230 may be positioned between the stop 290 and the tail 234 along the longitudinal direction "L". In addition, the electrical socket 110 may be provided with the tongue 296 extending outwardly to contact the stop 290. Accordingly, and as detailed herein elsewhere, the stop 290 may resist the tongue 296 when the electrical socket 110 and the seating device 100 are positioned at the second engagement position as illustratively depicted in FIG. 5C, thus preventing any further movement of the electrical socket 110 along an assembly direction "E". In other embodiments, the stop 290 may be located at a position opposite of what is shown in the FIGs for assembly purpose or to match the position of the tongue of the electrical socket 110. In other words, the tail 234 may be positioned between the head 232 and the stop 290 along the longitudinal direction "L".

In one or more embodiments and further in view of FIG. 2, the body 220 may further be provided with a recess 280. The recess 280 may be positioned between the stop 290 and the head 232 along the longitudinal direction "L". The tongue 296 may be at least partially received within the recess 280 for an engagement when the electrical socket 110 and the seating device 100 are positioned at the second engagement position. Accordingly, the contact area between the tongue 296 and the stop 290 may be increased, thus improving the robustness of the connection.

Figure 6A:
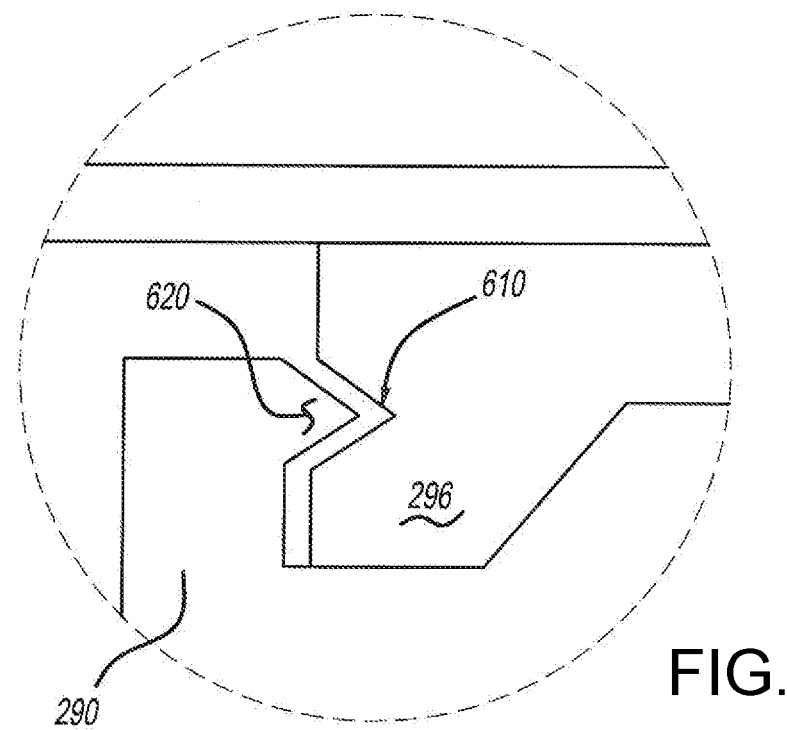
FIG. 6A illustratively depicts an enlarged partial view of the electrical socket and the seating device referenced in FIG. 5B.
Figure 6B:
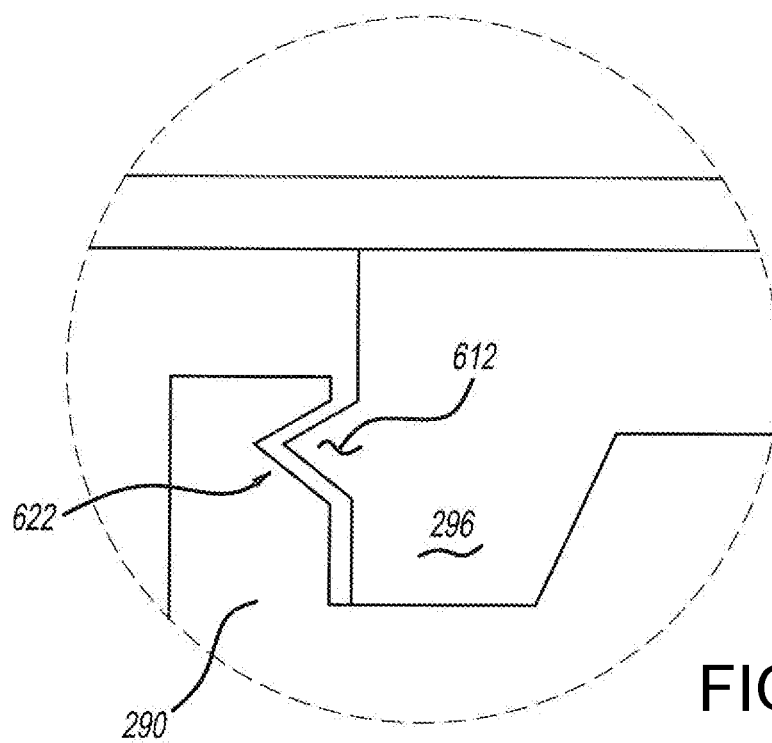
FIG. 6B illustratively depicts an enlarged partial view of an alternative embodiment of the electrical socket and the seating device referenced in FIG. 5B.

In other embodiments and in view of FIG. 6A, the stop 290 may be provided with a protrusion 620, and the tongue 296 may be provided with a notch 610. Particularly, the protrusion 620 may protrude outwardly along the longitudinal direction from the stop 290, and the notch 610 may present a recess oriented inwardly from the tongue 296. Accordingly, and at the second engagement position, the protrusion 620 may engage the notch 610, thus further improving on the robustness of the connection. Alternatively, and as illustratively depicted in FIG. 6B, the configuration may be of a reverse manner such that the stop 290 defines a notch 622 instead of the protrusion 620, and the tongue 296 defines a protrusion 612 instead of the notch 610, where a match and/or collaboration between the protrusion 612 and the notch 622 helps with the engagement of the electrical socket 110 relative to the seating device 100.

Referring back to FIG. 2, the body 220 of the seating device 100 may be connected to the interior trim panel 102. In one or more embodiments, the seating device 100 may include a base 250 with a supporting surface 252. The body 220 may contact the supporting surface 252 and be supported on the base 250. The base 250 may be connected to the interior trim panel 102, thereby connecting the body 220 and the seating device 100 with the vehicle interior trim panel 102. In another one or more embodiments, the base 250 may be formed integrally with the interior trim panel 102 or be part thereof, and the supporting surface 252 may be aligned with an inner surface of the interior trim panel 102. For instance, the base 250 may be formed as a portion of the OHC panel. In other embodiments, the supporting surface 252 may protrude out of or be recessed relative to the inner surface of the interior trim panel 102. Accordingly, the seating device 100 may be formed as a portion of the interior trim panel 102, thereby reducing cost in manufacture and increasing robustness in structure. In other embodiments, the seating device 100 may further include a fastener (not shown) to fasten the connection of the body 220 to the interior trim panel 102.

In one or more embodiments, the tail 234 of the lip 230 may be positioned further away from the support surface 252 along the height or thickness direction "T" than the head 232. Particularly, and as illustratively depicted in FIG. 3, a distance between the head 232 and the supporting surface 252 along the height direction "T" is presented as H1 and a distance between the tail 234 and the supporting surface 252 along the height direction "T" is presented as H2, and H2 is greater than H1. As detailed herein elsewhere, this structure is believed to be advantageous in assisting the rotation of the electrical socket 110 relative to the seating device 100 from the first engagement position as illustratively depicted in FIG. 5B to the second engagement position as illustratively depicted in FIG. 5C.

Assembly and disassembly of the electrical socket 110 relative to the seating device 100 are further described below in view of FIG. 5A through 5C. Although the electrical socket 110 and seating device 100 as illustratively depicted in FIGS. 2 and 3 are referenced in the description by way of example, electrical sockets and/or seating devices with other structures may be utilized as needed without having to depart from a fair scope of the present invention.

Referring to FIG. 5A, the entry position of the electrical socket 110 relative to the seating device 100 is illustratively depicted. During assembly, the electrical socket 110 is to be contacted with the seating device 100. Particularly, the lip 230 of the seating device 100 may be inserted into the track 510 of the socket 110, and the second or head lower surface 244 of the lip 230 may contact the lower surface 514 of the track 510. As detailed herein elsewhere, the head 232 of the lip 230 may be of a relatively small thickness, facilitating its insertion into the track 510 with greater ease. Thereafter, the electrical socket 110 may be pushed along the assembling direction "E" until the entry position as illustratively depicted in FIG. 5A is reached. At this entry position, the fourth or tail upper surface 248 of the lip 230 may contact and be in an abutting relationship to the upper surface 512 of the track 510.

Thereafter, the socket 110 may be pushed further along the assembly direction "E". The lip 230 slides within the track 510, and the second surface 244 of the lip 230 contacts the lower surface 514 while the fourth surface 248 contacts the upper surface 512. During this sliding movement, the tongue 296 of the electrical socket 110 moves across the stop 290 to be above the recess 280.

Figure 5B:
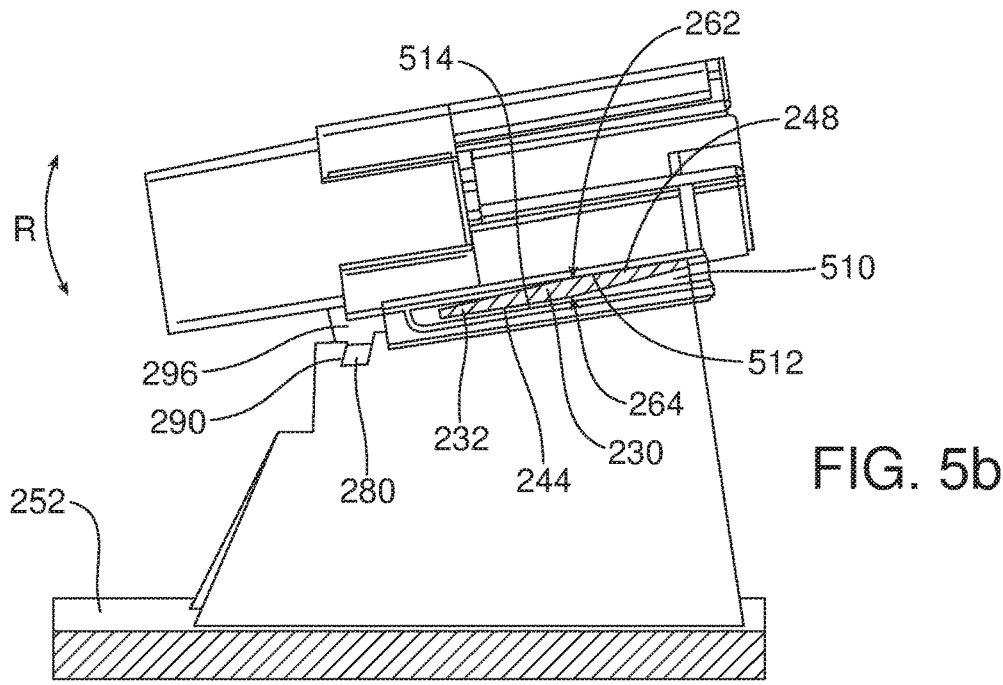
FIG. 5B illustratively depicts a partially cross sectional view of the electrical socket and the seating device referenced in FIG. 2 at a first engagement position.
Figure 5C:
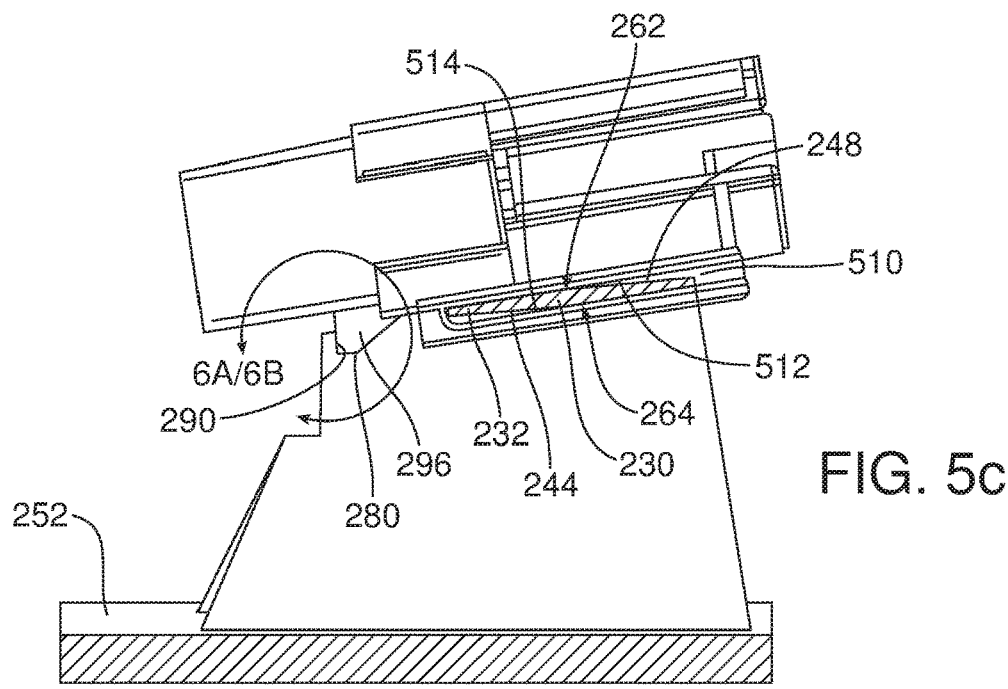
FIG. 5C illustratively depicts a partially cross sectional view of the electrical socket and the seating device referenced in FIG. 2 at a second engagement position.

Thereafter, the socket 110 may be moved to the first engagement position as depicted in FIG. 5B relative to the seating device 100. At this position, the second surface 244 and the fourth surface 248 may respectively engage the lower surface 514 and the upper surface 512 of the track 510. Furthermore, and in one embodiment, the lip 230 may be positioned and sized such that the head 232 contacts an end wall of the track 510 when the socket 110 is at the first engagement position. Such configuration is believed to be advantageous in that the operator may know whether the socket is at the first engagement position without having to examine the position of the lip 230 relative to the track 510 before taking the next step, thus expediting the assembly process with improved ease.

Once the socket 110 is at the first engagement position, a pivoting force may then be applied onto the socket 110 such that the socket 110 is to pivot about the upper protrusion 262 and the lower protrusion 264 downwardly along direction "R" or toward the supporting surface 252 and then to arrive at the second engagement position. As detailed herein elsewhere, the tail 234 of the lip 230 may be positioned further away from the support surface 252 along the height direction "T" than the head 232. In other words, the electrical socket 110 would be moving both upward along direction "T" and forward along direction "L" from its position in FIG. 5A to its position in FIG. 5B (See also FIG. 2). Accordingly, when the socket 110 proceeds along direction "E", the assembling force exerted on the socket 110 along direction "E" may be divided into a first sub force (a sliding force) enabling the track 510 to translate relative to the lip 230 and a second sub force (a pivoting force) enabling the track 510 to pivot relative to the lip 230. The force along the rotation direction R helps the transition of the electrical socket 110 from its position in FIG. 5B to its position in FIG. 5C.

Moreover, the electrical socket 110 and/or the track 510 may be formed of an elastic material. The upper surface 512 and lower surface 514 of the track 510 may deform whenever desirable if the pivoting force is large enough, which provides additional facilitation for the socket 110 to be pivoted to the second engagement position.

At the second engagement position, the first surface 242 and the third surface 246 of the lip 230 respectively engage the upper surface 512 and the lower surface 514 of the track 510, thus preventing the socket 110 from unnecessarily translating relative to the seating device 100 in the height direction "T". Furthermore, the tongue 296 may be at least partially received within the recess 280 and contact the stop 290, thus preventing the socket 110 from translating relative to the seating device 100 in the assembling direction "E". Moreover, and when flexible material is used, due to the distance between the upper protrusion 262 and the lower protrusion 264 being greater than the distance between the upper surface 512 and lower surface 514 of the track 510, the socket 110 may not pivot relative to the seating device 100 without a force being exerted onto the socket 110 or when the exerted force is less than a certain threshold, accordingly the socket 110 may maintain in position against rotation in direction "R". Accordingly, a robust connection between the socket 110 and the seating device 100 may be established even when the vehicle is in operation.

For disassembly, the socket 110 may be exerted onto with a pivoting force upwardly in direction "R", such that the tongue 296 may be released from the recess 280 and the socket 110 may then pivot about the upper protrusion 262 and the lower protrusion 264 relative to the seating device 100 back to the first engagement position as depicted in FIG. 5B. Moreover, the reversal disengagement may be further facilitated when the electrical socket 110 and/or the seating device 100 and its lip 230 in particular employ the use of one or more flexible materials such as rubber and soft polymers. As detailed herein elsewhere, and under a suitable pivoting force, the upper surface 512 and the lower surface 514 of the track 510 and/or the lip 230 elastically deform, such that the socket 110 may pivot relative to the seating device 100 with greater ease. The shape and thickness of the lip 230 as well as the distance between the upper surface 512 and the lower surface 514 may be configured so as to obtain a threshold value of a pivoting force for each. Accordingly, unwanted disassembly of the electrical socket 110 away from the seating device 100 due to vehicle vibrations may be effectively avoided. Furthermore, due to the freedom of movement, albeit limited, between the socket 110 and the seating device 100, the tongue 296 may disengage the stop 290 easily without having to cause the track 510 to deform in a great extent, thus preventing damages to the socket 110 or the seating device 100 during disassembly.

Then, the socket 110 may be disassembled from the seating device 100 in a reverse manner relative to the assembly process detailed herein above.

In one or more embodiments, the present invention provides a seating device to support an electrical socket, and a vehicle interior trim assembly employing the same. One skilled in the art will readily recognize from such discussion, and from the accompanying drawings and claims that various changes, modifications and variations can be made therein without departing from the true spirit and fair scope of the invention as defined by the following claims.

What is claimed is:

1. A combination seating device and electrical socket, comprising:
   a body; and
   a lip extending from the body and including a head, a tail, and a waist positioned there-between along a longitudinal direction, the waist including an upper protrusion and a lower protrusion directed outwardly against each other along a thickness direction, the electrical socket contacting and pivoting about the upper protrusion and the lower protrusion from a first engagement position to a second engagement position.

2. The combination seating device and electrical socket of claim 1, wherein the head and waist together define a first surface and a second surface opposing each other, the tail and waist together define a third surface and a fourth surface opposing each other, the first and the fourth surfaces define there-between an upper angle, and the second and the third surfaces define there-between a lower angle with an angle difference relative to the upper angle being no greater than 25 degrees.

3. The combination seating device and electrical socket of claim 2, wherein the first surface and the third surface define there-between a first angle of no greater than 25 degrees.

4. The combination seating device and electrical socket of claim 2, wherein the second surface and the fourth surface define there-between a second angle of no greater than 25 degrees.

5. The combination seating device and electrical socket of claim 2, wherein a first length difference between the first and third surfaces along a longitudinal dimension is no greater than 25 percent.

6. The combination seating device and electrical socket of claim 2, wherein a second length difference between the second and fourth surfaces along a longitudinal dimension is no greater than 25 percent.

7. The combination seating device and electrical socket of claim 1, further comprising a stop extending from the body, the head being positioned between the stop and the tail along the longitudinal direction.

8. The combination seating device and electrical socket of claim 7, wherein the body further defines a recess positioned between the stop and the head along the longitudinal direction, the recess receiving a tongue of the electrical socket at the second engagement position.

9. The combination seating device and electrical socket of claim 7, wherein the stop defines a protrusion protruding along the longitudinal direction and engaging a notch on a tongue of the electrical socket at the second engagement position.

10. The combination seating device and electrical socket of claim 1, wherein the body includes a first body portion and a second body portion spaced apart from each other, and the lip includes a first lip portion and a second lip portion respectively extending from the first body portion and the second body portion.

11. The combination seating device and electrical socket of claim 1, further comprising a base, the body being supported on the base by contacting a support surface of the base.

12. The combination seating device and electrical socket of claim 11, wherein the tail is positioned further away from the support surface along a height direction than the head.

13. A combination seating device and electrical socket, comprising:
   a body; and
   a lip extending from the body and including a head, a tail and a waist positioned between the head and the tail along a longitudinal direction, the waist including an upper protrusion and a lower protrusion directed outwardly against each other along a thickness direction, the electrical socket contacting and pivoting about the upper protrusion and the lower protrusion from a first engagement position to a second engagement position, wherein the head and the waist together define a first surface and a second surface opposing each other, the tail and the waist together define a third surface and a fourth surface opposing each other, the first surface and the fourth surface define there-between an upper angle, the second surface and the third surface define there-between a lower angle with an angle difference relative to the upper angle being no greater than 25 degrees, the first surface and the third surface define there-between a first angle of no greater than 25 degrees, and the second surface and the fourth surface define there-between a second angle of no greater than 25 degrees.

14. A vehicle interior trim assembly comprising:
an electrical socket; and
a seating device to support the electrical socket, the seating device including a body, a lip extending from the body and including a head, a tail, and a waist positioned between said head and said tail along a longitudinal direction, the waist including an upper protrusion and a lower protrusion directed outwardly against each other along a thickness direction, the electrical socket contacting and pivoting about the upper protrusion and the lower protrusion from a first engagement position to a second engagement position.

* * * * *